(12) United States Patent
McCune, Jr.

(10) Patent No.: US 6,969,984 B2
(45) Date of Patent: Nov. 29, 2005

(54) DIRECT PHASE AND FREQUENCY DEMODULATION

(75) Inventor: Earl W. McCune, Jr., Santa Clara, CA (US)

(73) Assignee: Tropian, Inc., Cupertino, CA (US)

( * ) Notice: Subject to any disclaimer, the term of this patent is extended or adjusted under 35 U.S.C. 154(b) by 136 days.

(21) Appl. No.: 09/746,249

(22) Filed: Dec. 21, 2000

(65) Prior Publication Data

US 2002/0079879 A1 Jun. 27, 2002

(51) Int. Cl.[7] .............................................. G06M 1/10
(52) U.S. Cl. ................................ 324/76.48; 324/76.52
(58) Field of Search ........................... 324/76.48, 76.52, 324/76.53, 76.82; 327/46; 329/316, 318; 331/15; 375/200

(56) References Cited

U.S. PATENT DOCUMENTS

| | | | | |
|---|---|---|---|---|
| 5,220,293 A | * | 6/1993 | Rogers ........................ | 331/15 |
| 6,021,157 A | * | 2/2000 | Kanterakis et al. ......... | 375/200 |
| 6,075,410 A | * | 6/2000 | Wildhagen ................... | 329/318 |
| 6,104,762 A | * | 8/2000 | Fujimura ..................... | 375/324 |
| 6,107,848 A | * | 8/2000 | Pickering et al. ........... | 327/146 |
| 6,163,209 A | * | 12/2000 | Myers ......................... | 329/316 |
| 2002/0000800 A1 | * | 1/2002 | Hill ............................. | 324/76.82 |

* cited by examiner

*Primary Examiner*—Christine Oda
*Assistant Examiner*—Walter Benson

(57) ABSTRACT

The present invention, generally speaking, provides a time shift angle demodulator that is of simple construction and has an extended linear range. Range extension is achieved by using the input signals directly, not simply post-processing the S-PFD outputs. In accordance with one embodiment of the invention, a method of measuring the phase or frequency of a periodic input signal uses a periodic reference signal and includes comparing the input signal to the reference signal to obtain a lead signal and a lag signal; changing the count of an up/down counter in dependence on the input signal, the reference signal, the lead signal and the lag signal; and using the lead signal, the lag signal and the count signal to produce a phase or frequency signal. In accordance with another embodiment of the invention, an apparatus for measuring the phase or frequency of a periodic input signal uses a periodic reference signal and includes a comparison circuit for comparing the input signal to the reference signal to obtain a lead signal and a lag signal; a logic circuit, including an up/down counter, responsive to the input signal, the reference signal, the lead signal and the lag signal to change the count of the up/down counter; and circuitry for using the lead signal, the lag signal and the count signal to produce a phase or frequency signal.

8 Claims, 3 Drawing Sheets

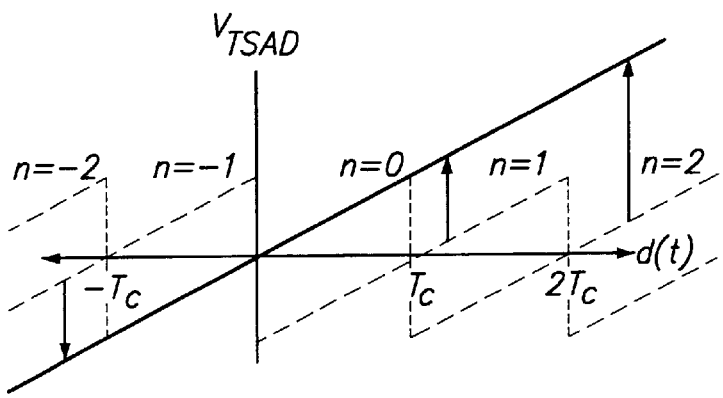
FIG. 5 *(PRIOR ART)*
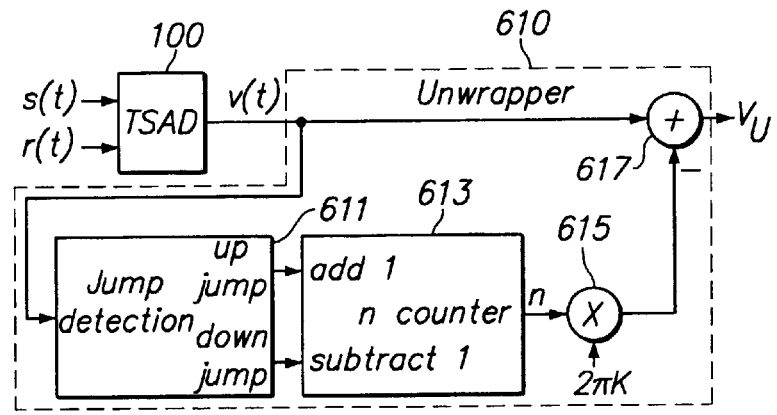
FIG. 6 *(PRIOR ART)*
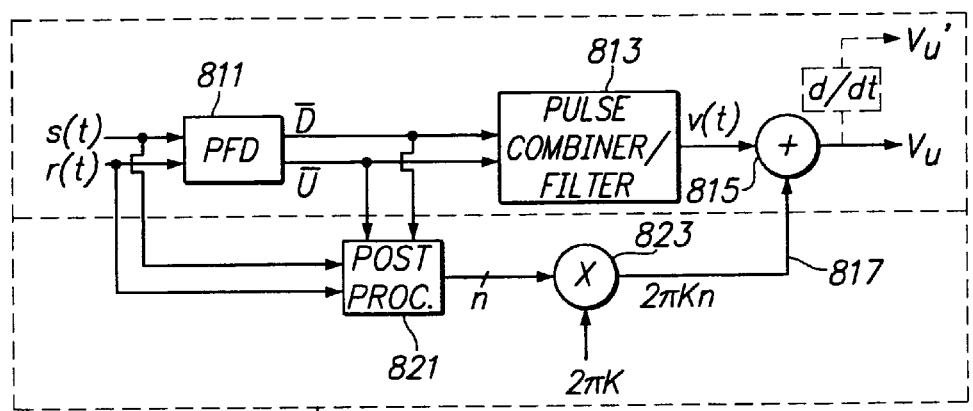
FIG. 8

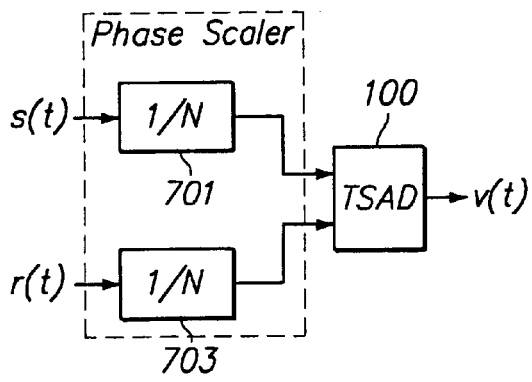
FIG. 7 *(PRIOR ART)*
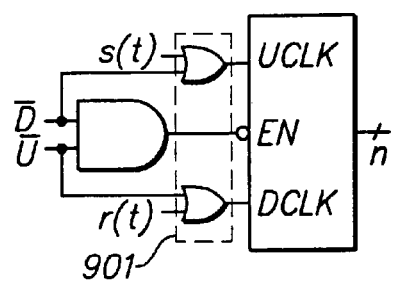
FIG. 9
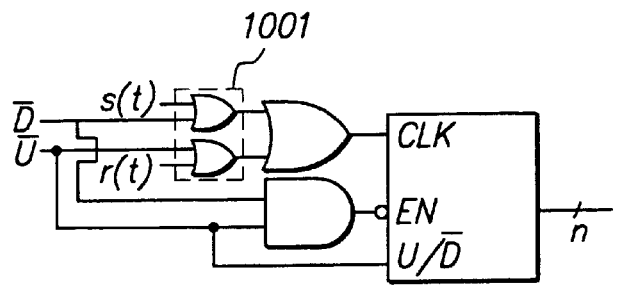
FIG. 10
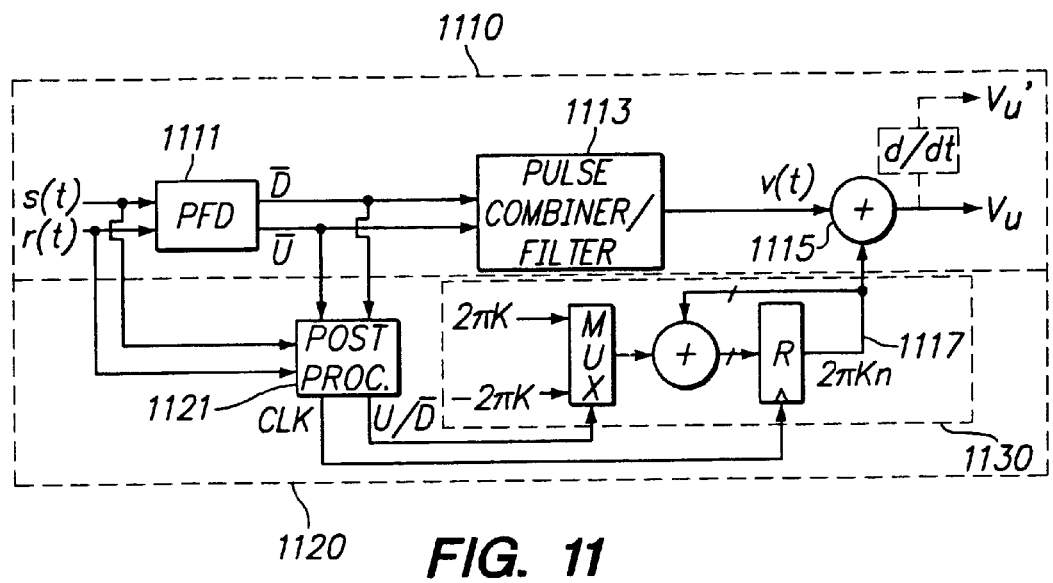
FIG. 11

DIRECT PHASE AND FREQUENCY DEMODULATION

BACKGROUND OF THE INVENTION

1. Field of the Invention

The present invention relates to direct phase and frequency demodulation.

2. State of the Art

Much attention has been focused in recent years on the realization of radio systems using digital logic. Digital logic is less subject to manufacturing variability and is often much simpler and consumes lower power than an equivalent analog structure. In particular, current communications techniques, at least in wireless communications, are based in large part on quadrature modulation and demodulation. Such modulators and demodulators are relatively power-hungry and subject to various inaccuracies and limitations that become apparent as performance is pushed to higher levels.

One proposal for a generally-applicable angle demodulator is described in the dissertation by the present inventor entitled *Extended Phase Shift Keying*, deposited in the library of the University of California at Davis in August 1998. Of particular interest is the so-called Time-Shift Angle Demodulator (TSAD), described in detail in Section 3.6.2 and Appendix B of the dissertation.

A block diagram of a TSAD 100 is shown in FIG. 1. The TSAD includes two stages, a time difference detector 101 and a pulse combiner/filter 103. The time difference detector measures time between adjacent the rising zero crossings of the two input signals s(t) and r(t). The first of these input signals is the angle modulated signal s(t). The second input signal is an applied reference signal r(t), which is assumed to be matched to the carrier of the angle modulated signal.

The timing information measured by the time difference detector is provided on one of two outputs, a(t) and b(t), at any one time, as a fixed amplitude pulse with width equal to the timing difference of the input signals. The output selected depends on which input signal a rising zero crossing is observed first. If a rising zero crossing of the modulated signal s(t) occurs first, then the measurement output appears on the phase lead output, a(t). If a rising zero crossing of the reference signal r(t) occurs first, then the measurement output appears on the phase lag output, b(t).

The time difference detector may be realized as a sequential phase-frequency detector (S-PFD), as shown in FIG. 2. The pulse combiner/filter may take the form of a differencing circuit followed by a low-pass filter (LPF).

Referring to FIG. 3, an example of operation of the TSAD is shown. The input signal s(t) is assumed to have a frequency 20% lower than that of the reference signal r(t). Initially, the phase of s(t) leads the phase of r(t). The two outputs from the time difference detector, a(t) and b(t), are shown. As the phase of s(t) shifts from leading to lagging the phase of r(t), a transition occurs in which pulses, instead of appearing in the output signal a(t), appear instead in the output signal b(t). The signals a(t) and b(t) are combined to form a difference signal a(t)-b(t), which is low-pass filtered, yielding an output signal v(t) that reflects the linear phase ramp relationship between the two input signals. Because the S-PFD aliases when phase shifts exceed $2\pi$, the S-PFD output "jumps" following the accrual of $2\pi$ radian phase shift on the reference signal with respect to the input signal. Corresponding jumps are reflected in the output signal v(t).

The transfer characteristic of the TSAD of FIG. 1 is shown in FIG. 4, showing the output v(t) as a function of the time difference d(t), where $T_c$ represents the period of the reference signal. The transfer characteristic consists of overlapping line segments each having an extent of $2Tc$, which corresponds to $4\pi$ radians of phase for the reference signal. When the time difference between the input signals becomes greater than $2\pi$ or less than $-2\pi$, a jump occurs to the next line segment as shown by the arrows in FIG. 4.

In order to increase the usefulness of the TSAD, it is necessary to eliminate the foregoing jumping characteristic, by shifting the line segments of FIG. 4 to form a single continuous line, as illustrated in FIG. 5. Such modification of the transfer relation may be accomplished using a "phase unwrapper," a diagram of which is shown in FIG. 6. The phase unwrapper 610 includes a jump detection unit 611, a counter 613, a multiplier 615 and an adder 617. In operation, when a jump is detected, the appropriate signal offset, expressed as $2\pi K$, is added or subtracted to form a corrected output signal $v_u$.

Referring to FIG. 7, correction may also be achieved using phase scaling. Both the input signals are passed through respective 1/N frequency dividers 701, 703 before being applied to the TSAD of FIG. 1. In order for the input signal to effect a $2\pi$ phase shift at the input of the TSAD, there must be a $2\pi N$ phase shift at the input to the frequency divider. Thus, with respect to the original signal, the TSAD appears to have had its range extended by a factor of N.

Further simplification of the TSAD, while preserving the transfer relationship of FIG. 5, is desired.

SUMMARY OF THE INVENTION

The present invention, generally speaking, provides a time shift angle demodulator that is of simple construction and has an extended linear range. Range extension is achieved by using the input signals directly, not simply post-processing the S-PFD outputs. In accordance with one embodiment of the invention, a method of measuring the phase or frequency of a periodic input signal uses a periodic reference signal and includes comparing the input signal to the reference signal to obtain a lead signal and a lag signal; changing the count of an up/down counter in dependence on the input signal, the reference signal, the lead signal and the lag signal; and using the lead signal, the lag signal and the count signal to produce a phase or frequency signal. In accordance with another embodiment of the invention, an apparatus for measuring the phase or frequency of a periodic input signal uses a periodic reference signal and includes a comparison circuit for comparing the input signal to the reference signal to obtain a lead signal and a lag signal; a logic circuit, including an up/down counter, responsive to the input signal, the reference signal, the lead signal and the lag signal to change the count of the up/down counter; and circuitry for using the lead signal, the lag signal and the count signal to produce a phase or frequency signal.

BRIEF DESCRIPTION OF THE DRAWING

The present invention may be further understood from the following description in conjunction with the appended drawing. In the drawing:

FIG. 5 is a plot of a desired transfer characteristic of the TSAD of FIG. 1;

FIG. 6 is a diagram of a postprocessing "phase unwrapper" used to achieve the transfer characteristic of FIG. 5;

FIG. 7 is a diagram of a phase scaler preprocessor used to achieve the transfer characteristic of FIG. 5;

FIG. 8 is a block diagram of a TSAD in accordance with an embodiment of the parent invention;

FIG. 9 is a diagram of one postprocessing unit that may be used in the TSAD of FIG. 8;

FIG. 10 is a diagram of another postprocessing unit that may be used in the TSAD of FIG. 8; and FIG. 11 is a block diagram of a TSAD in accordance with another embodiment of the present invention.

DETAILED DESCRIPTION OF THE PREFERRED EMBODIMENTS

Figure 1:
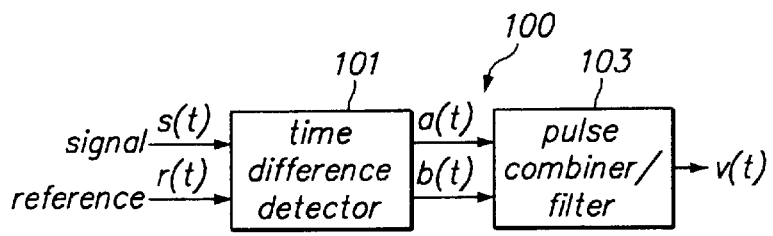
FIG. 1 is a block diagram of a known time shift angle demodulator (TSAD)
Figure 2:
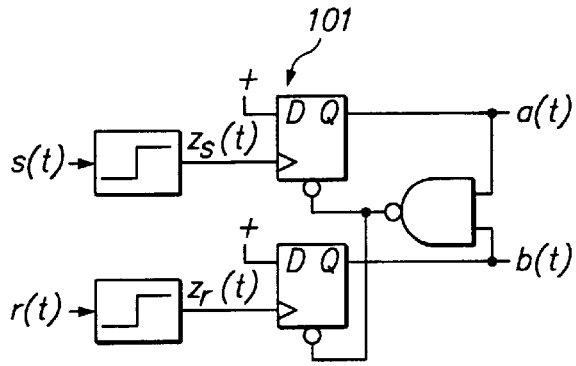
FIG. 2 is a diagram of the time difference detector of FIG. 1.
Figure 3:
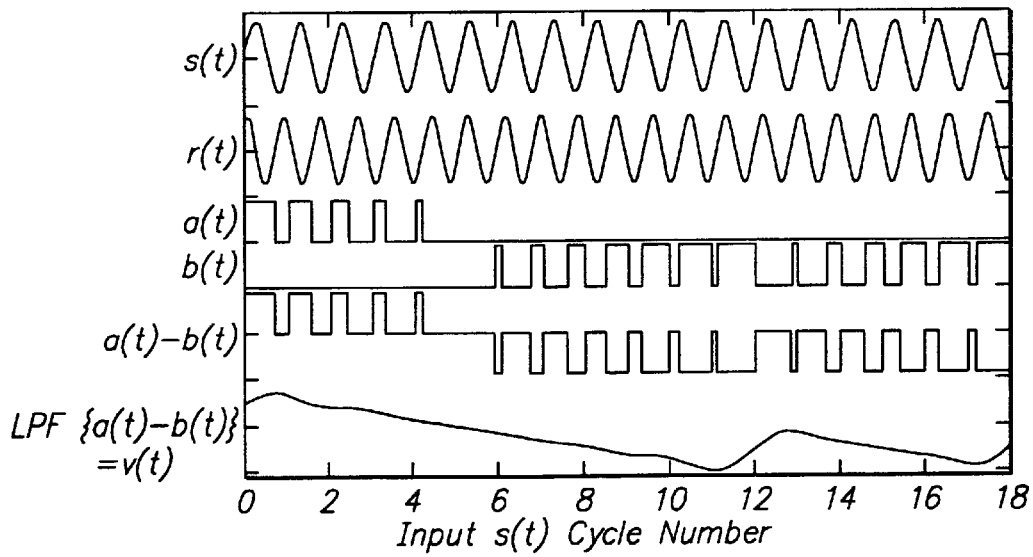
FIG. 3 is a timing diagram illustrating operation of the TSAD of FIG. 1.

Referring now to FIG. 8, a diagram is shown of a time difference angle demodulator (TSAD) in accordance with an illustrative embodiment of the invention. The TSAD receives the same input signals and produces the same output signal as the TSAD of FIG. 6 but is simpler and potentially more accurate.

As seen in FIG. 8, the TSAD includes a first forward path 810 and a second forward path 820. The first forward path may be the same as corresponding portions of the TSAD of FIG. 6. That is, the input signal s(t) and the reference signal r(t) are applied to a sequential phase-frequency detector (S-PFD) 811, which produces a lead signal $\overline{D}$ and a lag signal $\overline{U}$. The latter signals are applied to a pulse combiner/filter circuit 813, which produces an "aliased" output signal v(t). A summation circuit 815 combines the aliased output signal v(t) with a correction factor 817 to produce an "unwrapped" output signal $v_u$. The summation circuit and the second forward path together realize a phase unwrapping circuit.

In the second forward path 820, a post-processing circuit 821 receives both the input signals to and the output signals from the S-PFD, i.e., the input signals 3s(t) and r(t) and the output signals $\overline{D}$ and $\overline{U}$. In response to these signals, the post-processing circuit produces an output signal n, indicating which of the multiple line segments of FIG. 4 the aliased output signal v(t) represents. The output signal n may be any integer value (positive, negative, or zero), implying that the range of the improved TSAD is limited only by the resolution (i.e., number of bits) of the output signal n.

The output signal n is applied to a multiplier 823 and multiples a constant value $2\pi K$. The result is applied to the summation circuit 815 and is subtracted from the aliased output signal v(t) to produce the unwrapped output signal $v_u$. Whereas the signal $v_u$ is a measure of the phase of the input signal s(t), a measure of the frequency of the input signal s(t) may be easily derived by taking the derivative of $v_u$ to produce an output signal $v_u'$. An optional differentiation circuit (which in some realizations may be a DSP or other processor) may be used for this purpose.

Figure 4:
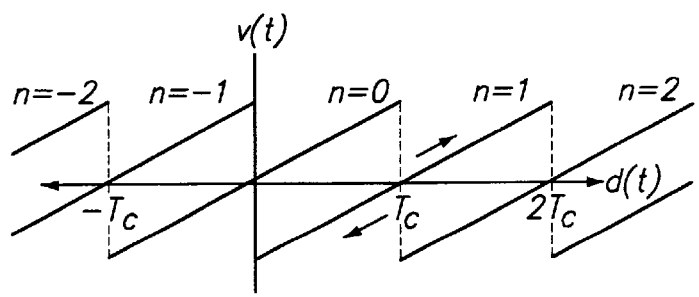
FIG. 4 is a plot of a transfer characteristic of the TSAD of FIG. 1.

Analysis shows that the following rules may be used to correctly identify a transition from a given line segment of FIG. 4 to an adjacent line segment to the right (calling for the output signal n of the post processor to be incremented), and a transition from a given line segment to an adjacent line segment to the left (calling for the output signal n of the post processor to be decremented):

If $\overline{D}=0$ and s(t)↑, ++n;

If $\overline{U}=0$ and r(t)↑, --n, where the up-arrow symbol represents a rising transition.

The post processor may be realized using any of a variety of logic circuits that implement the foregoing rules. Examples of such circuits are shown in FIG. 9 and FIG. 10.

Referring to FIG. 9, the signals $\overline{U}$ and $\overline{D}$ are logically ANDed together and the result is applied to the enable input of an up/down counter. The signal s(t) is applied to a UCLK input of the counter, and the signal r(t) is applied to a DCLK input of the counter. The output signal n of the counter is the output signal of the post processor 821. The logic gates 901 function to disable counting during normal operation.

Referring to FIG. 10, the signals $\overline{U}$ and $\overline{D}$ are again logically ANDed together and the result is applied to the enable input of an up/down counter. In addition, the $\overline{U}$ signal is applied to a U/D input of the counter. The signal s(t) and the signal r(t) are logically ORed together, and the result is applied to a CLK input of the counter. The output signal n of the counter is the output signal of the post processor. The logic gates 1001 function to disable counting during normal operation.

Assuming a postprocessing circuit like that of FIG. 10, the TSAD may be simplified as shown in FIG. 11. In particular, in FIG. 11, the multiplier of FIG. 8 is replaced by circuitry 1130, including a multiplexer and an accumulator comprising an adder and a register R. In operation, increments of $2\pi K$ are added or subtracted from the contents of the accumulator in accordance with the signals U/$\overline{D}$ and CLK produced by the postprocessing circuit 1121. The substantial overhead of a multiplier is therefore avoided.

Thus there has been described a time shift angle demodulator that provides for linear operation over a range of arbitrary extent and that is simple in construction. By performing postprocessing of both the input and output signals of a time difference detector (PFD), improved accuracy may be obtained.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of measuring the phase or frequency of a periodic input signal using a periodic reference signal, comprising:

comparing the input signal to the reference signal to obtain a lead signal and a lag signal; and changing the count of an up/down counter in dependence on the input signal, the reference signal, the lead signal and the lag signal; and using the lead signal, the lag signal and the count signal to produce a phase or frequency signal, including:

forming from the lead and lag signal a difference signal;

filtering the difference signal to produce a filtered signal; and adding to the filtered signal a correction signal of a magnitude determined in accordance with the count signal.

2. The method of claim 1, wherein the difference signal is filtered to produce an aliased output signal.

3. The method of claim 2, wherein the aliased output signal has added to it a correction signal representing a positive or negative phase increment to form an unwrapped output signal.

4. Apparatus for measuring the phase or frequency of a periodic input signal using a periodic reference signal, comprising:

a comparison circuit for comparing the input signal to the reference signal to obtain a lead signal and a lag signal;

a logic circuit, including an up/down counter, responsive to the input signal, the reference signal, the lead signal and the lag signal to change the count of the up/down counter; and means for using the lead signal, the lag signal and the count signal to produce a phase frequency signal, including:

means for forming from the lead and lag signal a difference signal;

means for filtering the difference signal to produce a filtered signal; and means for adding to the filtered signal a correction signal of a magnitude determined in accordance with the count signal.

5. The apparatus of claim 4, wherein the means for forming and means for filtering comprise a pulse combiner/filter, and the pulse combiner/filter filters the difference signal to produce an aliased output signal.

6. The apparatus of claim 5, wherein the adder adds to the aliased output signal a correction signal representing a positive or negative phase increment to form an unwrapped output signal.

7. The apparatus of claim 6, further comprising circuitry for forming the correction signal using the count of the up/down counter.

8. The apparatus of claim 7, wherein the circuitry for forming the correction signal comprises a multiplier having as one input signal a constant value and having as another input signal the count of the up/down counter.

* * * * *